United States Patent Office 2,729,624
Patented Jan. 3, 1956

2,729,624

POLYMERIZATION OF VINYL MONOMERS BY OXYHALOGEN ACID ANION/HYDRAZINE-DISULFONATE ION COMPOSITIONS

Edward G. Howard, Jr., Wilmington, Del., assignor to E. I. du Pont de Nemours and Company, Wilmington, Del., a corporation of Delaware No Drawing. Application April 2, 1953,
Serial No. 346,519

9 Claims. (Cl. 260—80)

This invention relates to the addition polymerization of polymerizable organic compounds and more particularly to new polymerization catalyst systems.

This application is a continuation-in-part of my copending application Serial No. 230,082, filed June 5, 1951, now abandoned.

Polymerization of ethylenically unsaturated compounds is a process of great technical importance. Generally employed as polymerization catalysts are compounds containing directly linked oxygen atoms such as benzoyl peroxide or potassium persulfate. In conventional polymerization systems, relatively high temperatures are required to obtain high rates of conversion of the monomeric unsaturate to a polymer. The use of elevated temperatures often leads to products of inferior qualities. In some instances where appreciable rates of polymerization have been achieved at lower temperatures, the products obtained have superior physical properties which are of substantial economic importance, such as, for example, the increased abrasion resistance of synthetic rubbers prepared at temperatures which are low. Accordingly, new and improved systems of low temperature addition polymerization in high conversion are of considerable interest.

This invention has as an object the provision of a new process for polymerizing addition polymerizable ethylenic compounds. Other objects will appear hereinafter.

These objects are accomplished by this invention wherein a monomer subject to addition polymerization by reason of a non-aromatic carbon carbon double bond, i. e., an ethylenic double bond, is polymerized by bringing the same in contact with a salt of hydrazinedisulfonic acid, $HO_3SHNNHSO_3H$, and an inorganic oxidizing agent containing in its anion a halogen of atomic number in the range of 35–53, i. e., a halogen of the first two long periods, i. e., bromine and iodine, and a plurality of oxygen atoms, preferably an oxidizing agent of the class consisting of water soluble bromates, iodates, and periodates.

The following examples in which parts are by weight are illustrative of the invention.

Example I

A glass vessel was charged with 13.2 parts of acrylonitrile, 220 parts of water, 0.88 part of pyridinium hydrazinedisulfonate, and 0.42 part of potassium bromate as an oxidizing agent. The vessel was flushed with oxygen-free nitrogen and the vessel closed. After standing (with occasional agitation) for 24 hours at 25° C. the vessel was opened and the polymer isolated by filtration. A total of 7.0 parts of dry polymer was obtained corresponding to a 53% conversion.

The polyacrylonitrile was dissolved in dimethylformamide and heated at 125° C. The polymer solution was only slightly colored, whereas control systems in which the polymer was prepared with a peroxide catalyst (ammonium persulfate-sodium meta-bisulfite mixture) exhibited much greater color. Heating the polymer itself in air at 165° C. produced less color than heating a polymer prepared with persulfate, hydrogen peroxide, or perborate systems.

Example II

When the general procedure of Example I was repeated except that 0.57 part of paraperiodic acid was used as the oxidizing agent, an 85% conversion of monomer to polymer was effected.

Example III

A glass vessel equipped with stirrer, thermometer, gas inlet tube and condenser was charged with 56 parts of absolute ethyl alcohol, 50 parts of water, 0.88 part of pyridinium hydrazinedisulfonate, 15.6 parts of vinyl chloride, and, as oxidizing agent, 0.42 part of potassium bromate. After four hours at 25° C., there was obtained a 96% conversion of monomer to polyvinyl chloride.

Example IV

When the general procedure of Example III was repeated except that 0.57 part of paraperiodic acid was used as the oxidizing agent and the polymerization time was 1.5 hours, a 70% yield of polymer was obtained.

Example V

A glass vessel was charged with 40 parts of distilled water and 60 parts of absolute ethyl alcohol. Air was flushed from the vessel by nitrogen and 16 parts of vinyl chloride and four parts of allyl glycidyl ether added. The vessel was closed and cooled to 0° C. At 30 minute intervals for four times there was injected into the vessel one part of a 20% solution of pyridinium hydrazinedisulfonate in distilled water and one part of a 12% solution of paraperiodic acid in distilled water. After a total of four hours, the contents of the vessel was discharged into 40 parts of methanol and the coagulated polymer filtered and dried. There was obtained 10 parts of copolymer corresponding to a 50% conversion of monomers to copolymer.

Example VI

A vessel was charged with 12.5 parts of methyl methacrylate, 48 parts of ethyl alcohol, 60 parts of water, 0.44 part of pyridinium hydrazinedisulfonate and 0.21 part of potassium bromate as the oxidizing agent. After two hours at 25° C., a 67% conversion of monomer to polymer was obtained.

Example VII

When the general procedure of Example VI was repeated except that 0.24 part of paraperiodic acid was used as the oxidizing agent, after 1.5 hours, an 83% conversion of monomer to polymer was obtained.

Example VIII

When the general procedure of Example I was repeated except that 0.5 part of sodium iodate with 5 parts of 0.5 N hydrochloric acid was used as the oxidizing agent, an 83% conversion of monomer to polymer was obtained in three hours.

Example IX

A solution comprising 21.2 parts of acrylonitrile, 280 parts of water and 3.4 parts of potassium bromate was stirred under nitrogen at 50° C. and a solution of 2.68 parts of potassium hydrazinedisulfonate in 40 parts of water was added slowly. The addition was accomplished in one-half hour and the reaction was held at 50° C. for another hour. The polymer was removed by filtration and washed by reslurrying in water. A 33% yield of polymer having an inherent viscosity of 4.11 was obtained. Films cast from a solution of this polymer in dimethylformamide were receptive toward basic dyes such as methylene blue but had substantially no receptivity toward a representative acid dye.

*Example X*

A solution comprising 21.2 parts of acrylonitrile, 3.4 parts of potassium bromate, 320 parts of water and 3.5 parts of pyridinium hydrazinedisulfonate was stirred under nitrogen at 65° C. After 1½ hours at this temperature, the polymer formed was filtered and washed with water. A 76.4% yield of polymer having an inherent viscosity of 5.21 was obtained. Films cast from a solution of this polymer in dimethylformamide were dyed by basic dyes such as methylene blue.

The process of this invention is of generic application to the addition polymerization of polymerizable compounds having the non-aromatic or ethylenic, $>C=C<$ group. It is applicable to monomeric unsaturated polymerizable compounds in which the unsaturation is due to a terminal ethylenic group which is attached to a negative radical. It is thus applicable to polymerizable vinylidene compounds, including vinyl compounds and particularly preferred are those which cotain the $CH_2=C<$ group.

Compounds having a terminal methylene which are subject to polymerization and copolymerization include olefins, e. g. ethylene and isobutylene; acrylyl and alkacrylyl compounds, e. g. acrylonitrile, methyl acrylate, ethyl methacrylate, methacrylic acid, methacrylamide; vinyl and vinylidene halides; e. g. vinyl fluoride, vinylidene chloride; vinyl carboxylates, e. g. vinyl acetate, vinyl trimethylacetate; vinyl imides, N-vinyllactams, e. g. N-vinylcaprolactam; vinyl aryls such as styrene and other vinyl derivatives such as vinylpyridine, methyl vinyl ketone and vinyl ethyl ether. Polyacrylonitrile polymers prepared by the process of this invention show unexpectedly superior receptivity toward basic dyes when compared with the polyacrylonitrile polymers otherwise simliar but prepared by other methods, e. g., peroxy catalysts alone.

Polyfluoroethylenes including tetrafluoroethylene, chlorotrifluoroethylene and 1,1-dichloro-2,2-difluoroethylene can be polymerized and copolymerized by the process of this invention.

Polymerizable compounds that have a plurality of ethylenic double bonds that can be polymerized or copolymerized include those having conjugated double bonds, such as butadiene and 2-chlorobutadiene, and compounds which contain two or more double bonds which are isolated with respect to each other, such as ethylene glycol dimethacrylate, methacrylic anhydride, diallyl maleate and divinyl benzene.

In addition to copolymers obtainable from the classes of monomers mentioned above, the copolymerization of fumaric or maleic esters with types of monomers mentioned, can be effected by the process of this invention. Furthermore, the term "polymerization" is meant to include within its scope, in addition to the polymerization of a monomer alone or of two or more monomers, i. e., copolymerization, the polymerization of unsaturated monomer in the presence of a chain transfer agent, e. g., carbon tetrachloride. The latter has been called "telomerization."

This invention is applicable to the polymerization of any unsaturated compound subject to addition polymerization by prior techniques. Optimum conditions may vary from monomer to monomer and since liquid phase polymerization is desired, gases such as ethylene and propylene require pressures.

The polymerizations are usually carried out at −40° C. to 60° C. Although temperatures may be lower, however the rate of polymerization is generally low. Higher temperatures, e. g. up to 100° C. or higher, may be used, particularly when the time of polymerization is to be kept at a minimum, e. g. in a continuous process. Although this invention may be practiced over a wide temperature range, optimum results are obtained at not more than 40° C. and suitably 0–40° C. in liquid aqueous systems. In general, the time required for substantial polymerization depends upon other variables such as the specific temperature and concentrations of monomer, catalyst, etc. Times of from a few minutes to 24 hours are customarily employed.

The polymerization may be carried out by conventional means. Liquid media in which the catalyst, monomer, and diluent are uniformly dispersed, such as solutions or emulsions, are preferred. In general, aqueous systems are preferred. For acrylonitrile polymerizations, aqueous systems which have been adjusted to a pH of 2–6 with a halogen acid give superior polymers.

Any hydrazinedisulfonic acid salt which yields hydrazine disulfonate ion, $-O_3SHNNHSO_3-$ under the conditions of polymerization, i. e., any soluble hydrazinedisulfonate, may be employed. The amount of hydrazinedisulfonate that is employed can vary widely. Generally amounts of from 0.01 to 10% based on the weight of polymerizable monomers are employed. It is generally convenient to employ an alkali metal, e. g., sodium or potassium, ammonium, or quaternary ammonium, e. g., tetraethylammonium, salt of hydrazinedisulfonic acid as the source of the ion. For the preparation of salts of hydrazinedisulfonic acid, see Konrad and Pellens, Ber. 59B 135–8 (1926), and sources therein cited.

Not all oxidizing agents may be employed. Thus sodium vanadate, sodium selenate, potassium perchlorate, potassium chlorate, and potassium nitrate had little or no effect. The examples are illustrative of the use, with advantageous results, of water soluble inorganic halogen compounds having in the anion a halogen of atomic number in the range 35–53 and a plurality of oxygen atoms and particularly of water soluble bromates, iodates, and periodates. The bromates, iodates, and periodates are preferred. The amount of oxidizing agent present is generally less than the amount of hydrazinedisulfonate and may be present in much smaller amounts, e. g., from 0.001 to 50% of the amount of hydrazinedisulfonate.

Polymerizations by the process of this invention give high conversion of polymer at low temperatures. The hydrazinedisulfonate is a non-oxidizing material and generally quite stable.

The foregoing detailed description has been given for clearness of understanding only and no unnecessary limitations are to be understood therefrom. The invention is not limited to the exact details shown and described for obvious modifications will occur to those skilled in the art.

What is claimed is:

1. Process for the polymerization of a monomer subject to addition polymerization and containing a carbon carbon double bond which comprises bringing said monomer in contact, in an aqueous system, with a water soluble hydrazinedisulfonate and an oxidizing agent of the class consisting of water soluble bromates, iodates, and periodates.

2. Process for the polymerization of a monomer subject to addition polymerization and containing a carbon carbon double bond which comprises bringing said monomer in contact, in an aqueous system, with hydrazinedisulfonate ion and a water soluble bromate.

3. Process for the polymerization of a vinylidene monomer subject to addition polymerization which comprises bringing said monomer in contact, in an aqueous system, with hydrazinedisulfonate ion and an oxidizing agent of the class consisting of water soluble bromates, iodates, and periodates.

4. Process for the polymerization of a vinylidene monomer subject to addition polymerization which comprises bringing said monomer in contact, in an aqueous system, with hydrazinedisulfonate ion and a water soluble bromate.

5. Process for the polymerization of a vinyl monomer subject to addition polymerization which comprises bringing said monomer in contact, in an aqueous system, with hydrazinedisulfonate ion and an oxidizing agent of the class consisting of water soluble bromates, iodates, and periodates.

6. Process for the polymerization of a vinyl monomer subject to addition polymerization which comprises bringing said monomer in contact, in an aqueous system, with hydrazinedisulfonate ion and a water soluble bromate.

7. Process for the polymerization of a monomer subject to addition polymerization and containing a carbon carbon double bond which comprises bringing said monomer in contact, in an aqueous system, with hydrazinedisulfonate ion and a water soluble iodate.

8. Process for the polymerization of a monomer subject to addition polymerization and containing a carbon carbon double bond which comprises bringing said monomer in contact, in an aqueous system, with hydrazinedisulfonate ion and a water soluble periodate.

9. Process for the polymerization of a monomer subject to addition polymerization and containing a carbon carbon double bond which comprises bringing said monomer in contact, in an aqueous system, with hydrazinedisulfonate ion and paraperiodic acid.

References Cited in the file of this patent

UNITED STATES PATENTS

| 2,572,028 | Hunt | Oct. 23, 1951 |
| 2,617,783 | Slocombe et al. | Nov. 11, 1952 |